US011198075B2

(12) United States Patent
Strain et al.

(10) Patent No.: US 11,198,075 B2
(45) Date of Patent: *Dec. 14, 2021

(54) ENERGY REDUCTION AND MONITORING CONTROL SYSTEM FOR BACKWASHING MEDIA SYSTEMS

(71) Applicant: Nexom (US), Inc., Grafton, WI (US)

(72) Inventors: Cornelius J. Strain, Post Falls, ID (US); Ryan Coe, Coeur d'Alene, ID (US); Miguel A. Gutierrez, Thomasville, GA (US)

(73) Assignee: NEXOM (US), INC., Grafton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/313,089

(22) Filed: Nov. 21, 2016

(65) Prior Publication Data

US 2018/0229156 A1 Aug. 16, 2018

Related U.S. Application Data

(63) Continuation of application No. PCT/US2015/031860, filed on May 20, 2015.
(Continued)

(51) Int. Cl.
*B01D 24/16* (2006.01)
*B01D 24/48* (2006.01)
(Continued)

(52) U.S. Cl.
CPC ......... *B01D 24/16* (2013.01); *B01D 24/4631* (2013.01); *B01D 24/4642* (2013.01);
(Continued)

(58) Field of Classification Search
CPC ............... C02F 1/004; C02F 2209/005; C02F 2209/006; C02F 2209/22; C02F 2209/11;
(Continued)

(56) References Cited

U.S. PATENT DOCUMENTS 4,246,102 A 1/1981 Hjelmner et al.
4,867,872 A 9/1989 Russell et al.
(Continued)

FOREIGN PATENT DOCUMENTS

WO 2006100611 A1 9/2006

OTHER PUBLICATIONS

International Patent Application No. PCT/US2015/031860, International Search Report and Written Opinion dated Aug. 19, 2015.
(Continued)

*Primary Examiner* — Krishnan S Menon
(74) *Attorney, Agent, or Firm* — Leber IP Law; Celia H. Leber

(57) ABSTRACT

The present technology relates to control systems for use with fluid treatment systems. In one embodiment, for example, a fluid treatment system includes a vessel configured to receive a fluid having one or more constituents and to separate one or more constituents from the fluid. The system can also include a tube extending along at least a portion of the vessel and a sensor. The tube can be in fluid communication with a pressurized air source, and the sensor can be configured to obtain a measurement of an operating parameter. The system can also include a controller in communication with the sensor and pressurized air source. The controller can execute one or more algorithms to determine a filter parameter based on the measurement of the operating parameter, compare the filter parameter to a threshold, and, based on the comparison, activate or deactivate the pressurized air source.

19 Claims, 15 Drawing Sheets

Related U.S. Application Data

(60) Provisional application No. 62/001,577, filed on May 21, 2014.

(51) Int. Cl.
*C02F 1/00* (2006.01)
*B01D 24/46* (2006.01)

(52) U.S. Cl.
CPC ..... *B01D 24/4689* (2013.01); *B01D 24/4853* (2013.01); *B01D 24/4861* (2013.01); *B01D 24/4884* (2013.01); *B01D 24/4892* (2013.01); *C02F 1/004* (2013.01); *C02F 1/008* (2013.01); *B01D 2201/087* (2013.01); *B01D 2201/54* (2013.01); *C02F 2209/005* (2013.01); *C02F 2209/006* (2013.01); *C02F 2209/02* (2013.01); *C02F 2209/03* (2013.01); *C02F 2209/11* (2013.01); *C02F 2209/22* (2013.01); *C02F 2209/40* (2013.01); *C02F 2303/16* (2013.01)

(58) Field of Classification Search
CPC .............. C02F 2209/02; C02F 2209/03; C02F 2209/40; C02F 2303/16; B01D 2201/54; B01D 24/16; B01D 24/4689; B01D 24/4642; B01D 24/4631; B01D 24/4853; B01D 24/4861; B01D 24/4892; B01D 24/4884; B01D 2201/087
See application file for complete search history.

(56) References Cited

U.S. PATENT DOCUMENTS

| | | | |
|---|---|---|---|
| 5,454,959 | A | 10/1995 | Stevens |
| 5,484,536 | A | 1/1996 | Yamaguchi et al. |
| 5,520,804 | A | 5/1996 | Ward |
| 5,611,921 | A | 3/1997 | Deskins |
| 6,251,294 | B1 | 6/2001 | Davis et al. |
| 6,387,283 | B1 | 5/2002 | Lind |
| 6,517,712 | B2 | 2/2003 | Xia et al. |
| 6,790,351 | B2 | 9/2004 | Xia et al. |
| 7,381,336 | B2 | 6/2008 | Stedman |
| 7,897,040 | B2 | 3/2011 | Newcombe |
| 8,206,599 | B2 | 6/2012 | Newcombe |
| 8,658,031 | B2 | 2/2014 | Streng et al. |
| 8,696,896 | B2 | 4/2014 | Boyd et al. |
| 8,771,521 | B2 | 7/2014 | Boyd et al. |
| 2002/0036164 | A1 | 3/2002 | Xia et al. |
| 2005/0077247 | A1 | 4/2005 | Stedman |
| 2005/0269254 | A1 | 12/2005 | Roitman |
| 2009/0178980 | A1 | 7/2009 | Newcombe |
| 2011/0100888 | A1 | 5/2011 | Newcombe et al. |
| 2012/0325753 | A1 | 12/2012 | Baker et al. |
| 2013/0011274 | A1 | 1/2013 | Larsson |

OTHER PUBLICATIONS

U.S. Appl. No. 11/858,079, Final office action dated Jun. 29, 2010.
U.S. Appl. No. 11/858,079, Non Final office action dated Sep. 29, 2009.
U.S. Appl. No. 11/858,079, Notice of Allowance dated Dec. 28, 2010.
U.S. Appl. No. 13/005,379, Non final office action dated Apr. 13, 2011.
U.S. Appl. No. 13/005,379, Notice of Allowance dated May 13, 2011.
U.S. Appl. No. 13/005,415, Non final office action dated Jun. 10, 2011.
U.S. Appl. No. 13/005,415, Notice of Allowance dated Feb. 29, 2012.
U.S. Appl. No. 13/526,311, Final Office Action dated Jan. 23, 2015.
U.S. Appl. No. 13/526,311, Non Final Office Action dated Jun. 18, 2014.
U.S. Appl. No. 13/526,311, Non Final Office Action dated Mar. 15, 2013.
U.S. Appl. No. 13/526,311, Non-final Office Action dated Aug. 27, 2015.
U.S. Appl. No. 13/526,311, Notice of Allowance dated Jul. 11, 2016.
Oarkson Corporation; "DynaSand EcoWash Continuous or Intermittent Backwash Filter, with Continuous Upflow and Single Granular Media", https://www.parkson.com/products/dynasand-ecowash/continuous-or-intermittent-backwash-filter-with-continuous-upflow-and-single-granular-media, accessed Aug. 30, 2017.
U.S. Appl. No. 15/358,097, Final Office Action dated Apr. 9, 2019.
U.S. Appl. No. 15/359,035, Final Office Action dated Mar. 26, 2019.
U.S. Appl. No. 15/312,427, Non-Final Office Action dated Oct. 11, 2018.
U.S. Appl. No. 15/358,097, Non-Final Office Action dated Sep. 6, 2018.
U.S. Appl. No. 15/359,035, Non-Final Office Action dated Sep. 21, 2018.
U.S. Appl. No. 15/312,427, Final Office Action dated Jun. 19, 2019.
U.S. Appl. No. 15/312,427, Non-Final Office Action dated Sep. 27, 2019.
U.S. Appl. No. 15/358,097, Non Final Office Action dated Sep. 3, 2019.
U.S. Appl. No. 15/359,035, Advisory Action dated Jun. 6, 2019.
U.S. Appl. No. 15/359,035, Non-Final Office Action dated Jul. 15, 2019.
U.S. Appl. No. 15/312,427, Final Office Action dated Feb. 25, 2020.
U.S. Appl. No. 15/358,097, Notice of Allowance dated Mar. 19, 2020.
U.S. Appl. No. 15/359,035, Final Office Action dated Jan. 22, 2020.

ENERGY REDUCTION AND MONITORING CONTROL SYSTEM FOR BACKWASHING MEDIA SYSTEMS

CROSS-REFERENCE TO RELATED APPLICATION

The present application claims the benefit of U.S. Provisional Application No. 62/001,577, filed May 21, 2014, and is incorporated herein by reference in its entirety. U.S. Pat. No. 8,206,599, filed Jan. 12, 2011, and U.S. Pat. No. 7,972,509, filed Jan. 12, 2011, are also incorporated by reference herein in their entireties.

TECHNICAL FIELD

The present technology relates generally to fluid treatment systems. In particular, several embodiments are directed to control systems for use with fluid treatment systems and associated devices and methods.

BACKGROUND

Purified water is used in many applications, including the chemical, power, medical and pharmaceutical industries, as well as for human consumption. Typically, prior to use, water is treated to reduce the level of contaminants to acceptable limits. Treatment techniques include physical processes such as filtration, sedimentation, and distillation; biological processes such as slow sand filters or activated sludge; chemical processes such as flocculation and chlorination; and the use of electromagnetic radiation such as ultraviolet light. In water treatment applications, contaminants from wastewater such as storm water runoff, sediment, heavy metals, organic compounds, animal waste, and oil and grease must be sufficiently removed prior to reuse. Water purification plants and water purification systems often make use of numerous water filtration units for purification. It would be desirable to provide improved filtering units to reduce the expense and complexity of such purification systems.

DETAILED DESCRIPTION

Figure 1:
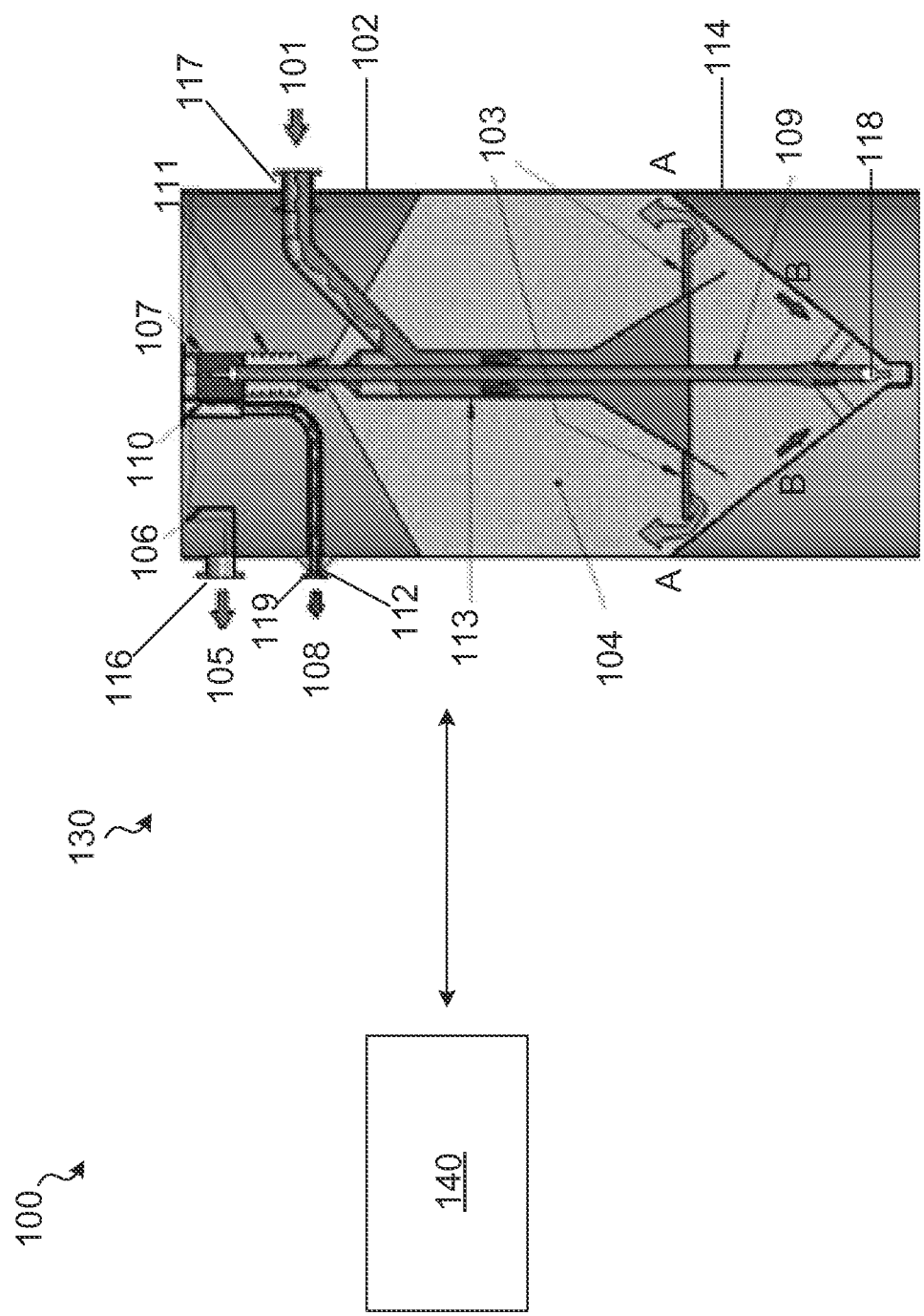
FIG. 1 is a partially schematic illustration of a fluid treatment system having a filtration control system configured in accordance with embodiments of the present technology.

The present technology is directed generally to fluid treatment systems including fluid filtration systems having one or more filtration control systems for reducing energy usage. The filtration control systems of the present technology are configured to automatically operate a continuous backwash filter within the process parameters particular to the application. Such a level of automation can be advantageous to enhance process reliability and fluid treatment quality of the application, reduce operator oversight (time, effort, enhanced safety), minimize process consumables through efficiency (chemical, air), minimize process waste (chemical, air, filter reject water or backwash), provide a continuous algorithm based controller rather than static set-point control, and provide an algorithm based constituent mass-balance control scheme involving multi-variable inputs.

In some embodiments, a fluid treatment system includes a vessel configured to receive a fluid having one or more constituents and separate one or more constituents from the fluid. The system can also include a tube extending along at least a portion of the vessel and a sensor. The tube can be in fluid communication with a pressurized air source, and the sensor can be positioned on or within the vessel. The sensor can be configured to obtain a measurement of an operating parameter. The system can also include a controller in communication with the sensor and pressurized air source. The controller can include memory and processing circuitry, and the memory can store instructions that, when executed by the controller using the processing circuitry, cause the controller to determine a filter parameter based on the measurement of the operating parameter, compare the filter parameter to a threshold, and, based on the comparison, activate or deactivate the pressurized air source.

In some embodiments, the vessel can include a reject outlet having a valve. The valve can be coupled to the controller. The controller can include one or more algorithms that, when executed by the processing circuitry, cause the controller to determine a filter parameter based on the measurement of the operating parameter, compare the filter parameter to a threshold, and, based on the comparison, open or close the reject valve. In other embodiments, the reject outlet does not include a valve and/or the valve is not configured to be opened/closed in response to controller analysis of filter parameters.

In a particular embodiment, the fluid treatment system can include an array of vessels, each configured to receive a fluid having one or more constituents and each configured to separate one or more constituents from the fluid, a plurality of tubes, each extending along at least a portion of a corresponding one of the vessels and fluidly coupled to a pressurized air source, a plurality of sensors, each positioned on or within a corresponding one of the vessels, and configured to obtain a measurement of an operating parameter, and a controller in communication with the sensors and pressurized air source. The controller can include memory and processing circuitry, and the memory can stores instructions that, when executed by the controller using the processing circuitry, cause the controller to determine a filter parameter based on the measurement, compare the filter parameter to a threshold, and based on the comparison, activate or deactivate the pressurized air source and/or open or close a valve coupled to a reject outlet.

Specific details of several embodiments of the technology are described below with reference to FIGS. 1-16. Other details describing well-known structures and systems often associated with fluid treatment systems have not been set forth in the following disclosure to avoid unnecessarily obscuring the description of the various embodiments of the technology. The fluid treatment system described herein is not limited to use with a moving-bed media filtration system and may be used with other fluid treatment devices, including those that utilize fixed, flowing or fluidized media. Although the fluid treatment system described herein is an upflow system, the control system described herein can be employed with a downflow system and/or other systems, such as other fluid treatment devices that utilizes fixed, flowing, or fluidized media. Moreover, the fluid treatment systems of the present technology are configured to filter and/or treat fluid from various applications, such as water and wastewater from industrial processes, domestic sewage treatment, land runoff, etc. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-16.

FIG. 1 is a partially schematic illustration of a system 100 configured in accordance with embodiments of the present technology. The system can include a fluid treatment system 130 and a filtration control system 140. The fluid treatment system 130 is configured to receive water containing one or more constituents and separate the constituents from a majority of the water. The fluid treatment system 130 can produce a large percentage of relatively clean effluent water and a small percentage of water concentrated with the constituents in a waste and/or recovery stream, as described in greater detail below. As used herein, "constituents" refer to contaminants (e.g., scale, etc.) and/or commodities (e.g., dissolved solids, oils, paraffins, organics, metals, inorganic materials, etc.). For ease of reference, water containing such constituents is referred to herein as "contaminated water" even though the water may contain only commodities and no contaminants.

In the embodiment shown in FIG. 1, the fluid treatment system 130 includes a vessel 114 having an inlet 117. In some embodiments, the fluid treatment system 130 can include more than one vessel (e.g., an array of vessels). The vessel 114 is configured to receive water having one or more constituents for treatment through the inlet 117. The vessel 114 includes a filter chamber 102 having a manifold 113, a media bed 104 with individual media (e.g., sand), a washbox 107, an airlift tube 109, a reject outlet 112, and an effluent outlet 116. The inlet 117 extends into the filter chamber 102 to discharge the contaminated water into a central portion of the media bed 104 through a distribution member or perforated manifold 113. In the embodiment shown in FIG. 1, the manifold 113 has a plurality of arms 103 extending radially into the body of the media bed 104.

The airlift tube 109 extends through a portion of the filter chamber 114 and has an outlet end at the washbox 107. The airlift tube 109 can be coupled to a pressurized air source (not shown) that delivers compressed air to the airlift tube 109 via an orifice 118. In some embodiments, the pressurized air source can be a variable frequency driven (VFD) compressor. In several of those embodiments having more than one vessel, the vessels can be arranged in parallel and a single pressurized air source can be coupled to all of the vessels.

The washbox 107 is configured to break up any clumps of media that enter the washbox 107 and/or to further separate constituents from the media (e.g., via tortuous pathway 111). As shown in the isolated, sectioned view of the washbox 107 in FIG. 2 and top perspective view of FIG. 3, the washbox 107 can include a weir 110 (referred to herein as "the reject weir 110") configured to control a water level in the washbox 107.

The system 100 and/or washbox 107 can further include a sensor 120 (such as an ultrasonic sensor, a vibration sensor, a laser level, etc.) configured to measure a water level in the washbox 107. The system 100 can also include other sensors and/or measuring devices disposed at other locations within the fluid treatment system 130, such as temperature sensors, chemical sensors, flow rate sensors, etc.

Constituents separated from the media and/or fluid in the washbox 107 form a reject stream 108 that exits the vessel 114 via the reject outlet 112, and the separated media are recycled back to the media bed 104 for further use. In some embodiments, the reject outlet 112 can include a valve 119 in communication with the control system 140, as discussed in greater detail below. In other embodiments, the reject outlet 112 does not include a valve.

The fluid treatment system 130 also includes an effluent weir 106 for controlling outflow of filtered water 105 via the effluent outlet 116. As shown in FIG. 1, the effluent weir 106 controls a water level of the filter chamber 102 excluding the water level controlled by the reject weir 110 in the washbox 107.

In operation, contaminated water enters the vessel 114 via the inlet 117 which delivers the contaminated water to the perforated manifold 113. The contaminated water exits the arms 103 of the manifold 113 into the media bed 104. A majority of the water flows upward through the media bed 104 as indicated by arrows A while the media moves downward as indicated by arrows B. Contaminants and/or solids tend to be retained in the media bed 104 and carried downward with the media. Compressed air supplied to the chamber 102 via the orifice 118 forms air bubbles that are less dense than the surrounding media and water. The air bubbles rise upwardly and carry media, contaminants, and/or solids upwardly into the airlift tube 109. A scouring action occurs as the air bubbles, media, contaminants, and/or solids rise up the airlift tube 109. The scouring action tends to cause the contaminants and/or solids to be dislodged and/or separated from the media. Upon arrival at the top of the airlift tube 109, the air bubbles tend to rise up and leave the vessel 114 through one or more outlets (not shown). The media is relatively dense and tends to fall down around the mouth of the airlift tube 109 and into the washbox 107.

Constituents and/or solids tend to be less dense than the media and as such tend to float on the water above the washbox 107. Some of the constituents and/or solids may still be in some way attached to, or associated with, the media and as such tend to be carried downward with the media into the washbox 107. The washbox 107 can function to break up clumps of media and/or to separate constituents and/or solids from the media. The relatively dense media falls downward along tortuous pathway 111. Because of head pressure, water tends to flow upwardly from the filter chamber 102 along the tortuous pathway 111. Accordingly, the water creates a countercurrent flow to the descent of the media. Functionally, the countercurrent flow and/or interactions of the descending media with washbox surfaces defining the tortuous pathway 111 can cause clumps of media to be broken up and contaminants and/or solids to be carried upwardly with the water. Water, constituents and/or solids flow over the reject weir 110 to form a reject stream 108 that is removed via reject outlet 112.

Figure 2:
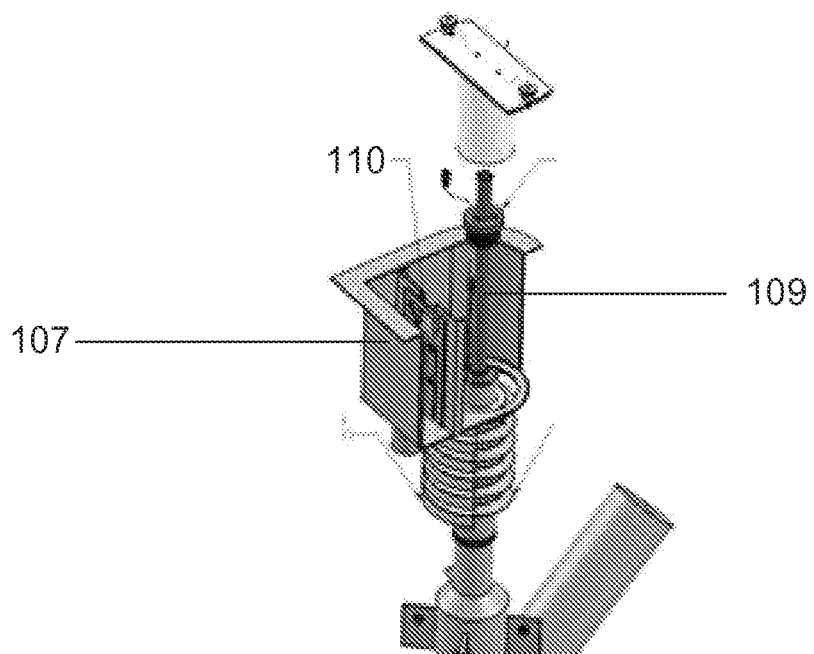
FIG. 2 is an exploded, sectioned view of a portion of the fluid treatment system shown in FIG. 1.
Figure 3:
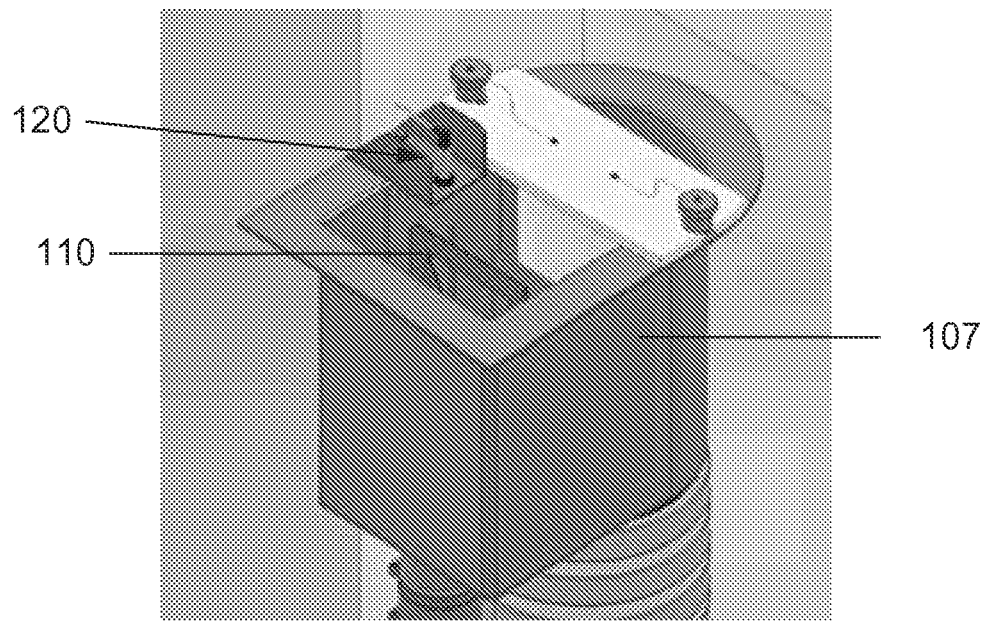
FIG. 3 is an isolated view of a portion of the fluid treatment system shown in FIG. 1.

Referring to FIGS. 1-3 together, the control system 140 is configured to communicate to one or more sensors or controllers associated with the fluid treatment system to reduce inefficiencies and improve energy usage. The control system 140 can include one or more controllers having processors, programmable logic controllers (PLC), memory, displays, input/output components, telemetry components, and/or other features known in the computing arts. The controller can include one or more algorithms (e.g., stored on the memory) configured to measure and/or calculate filtration efficiency informing parameters based on the operating parameter measurements to adjust operation of the fluid treatment system 130.

When the fluid treatment system 130 is on (e.g., receiving, treating, and/or processing an influent), the control system 140 can operate recirculate the media of the fluid treatment system 130 in at least one of two modes: (1) continuous mode and (2) intermittent mode. When media recirculation is in continuous mode, the reject valve 119 is open and the pressurized air source pumps compressed air through the airlift tube 109. When media recirculation is in intermittent mode, the control system 140 intermittently interrupts the normal recirculation of media operation by closing the reject valve 119 and/or de-activating the pressurized air source such that compressed air ceases being delivered to the airlift tube 109. The control system 140 performs such interruptions based on operating parameters that are continuously and/or periodically monitored by the control system 140 (via connection to one or more sensors and/or measuring devices associated with the fluid treatment system 130). Operating parameters can include temperature, time, pressure, flow rate, chemical concentrations, volumetric flow rate, and/or other suitable parameters. Such operating parameters can be measured at one or more locations throughout the fluid treatment system 130. For example, the fluid treatment system 130 can include a first pressure sensor at or near the inlet 117 to the vessel (configured to measure pressure in the inlet stream 101) (FIG. 1), and a second pressure sensor at or near the reject outlet 112 (configured to measure pressure in the reject stream 108). The control system 140 can also calculate and/or monitor derivatives of such operating parameters, such as temperature over a specified time, a maximum temperature, a maximum average temperature, a minimum temperature, a temperature at a predetermined or calculated time relative to a predetermined or calculated temperature, an average temperature over a specified time, a maximum flow rate, etc. As used herein, "operating parameters" includes operating parameter measurements, derivatives, manipulations, etc. Measurements may be taken at one or more predetermined times, ranges of times, calculated times, and/or times when or relative to when a measured event occurs.

Figure 4:
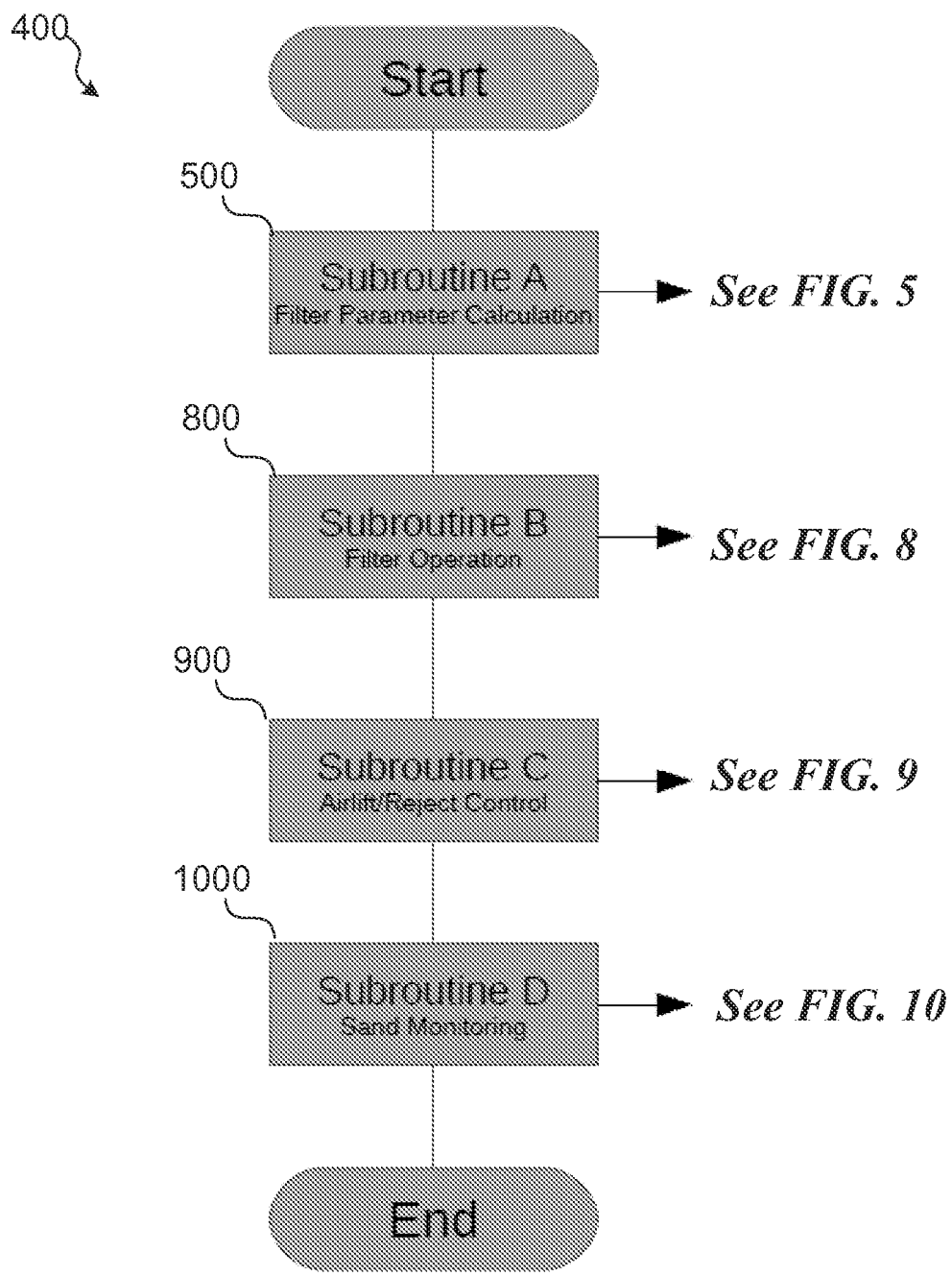
FIG. 4 is a flow chart illustrating an algorithm for automatically monitoring and controlling filtration operation within a fluid treatment system configured in accordance with embodiments of the present technology.

FIG. 4 is a flow chart showing one embodiment of a control system 400 configured to process four subroutines (500, 800, 900 and 1000) in parallel. Such a control system 400 can be used, for example, when the fluid treatment system 130 is in intermittent mode and/or continuous mode. As discussed below, each subroutine contains one or more algorithms configured to receive measurements related to one or more operating parameters, determine a filter parameter based on the measurements, evaluate the filter parameter based on application-specific thresholds, and affect operation of the fluid treatment system 130 based on the evaluation. As used herein, a "filter parameter" refers to a measured or calculated value with base or derived units that are indicative of water quality, fluid dynamic properties, and/or equipment/controller status. Examples of filter parameters include filter constituent mass loading, flow rate, headloss, constituent concentration, valve setting and other suitable parameters. It should be noted that in some embodiments the control system 400 may include more or less than four subroutines and/or process more or less than four subroutines.

Figure 5:
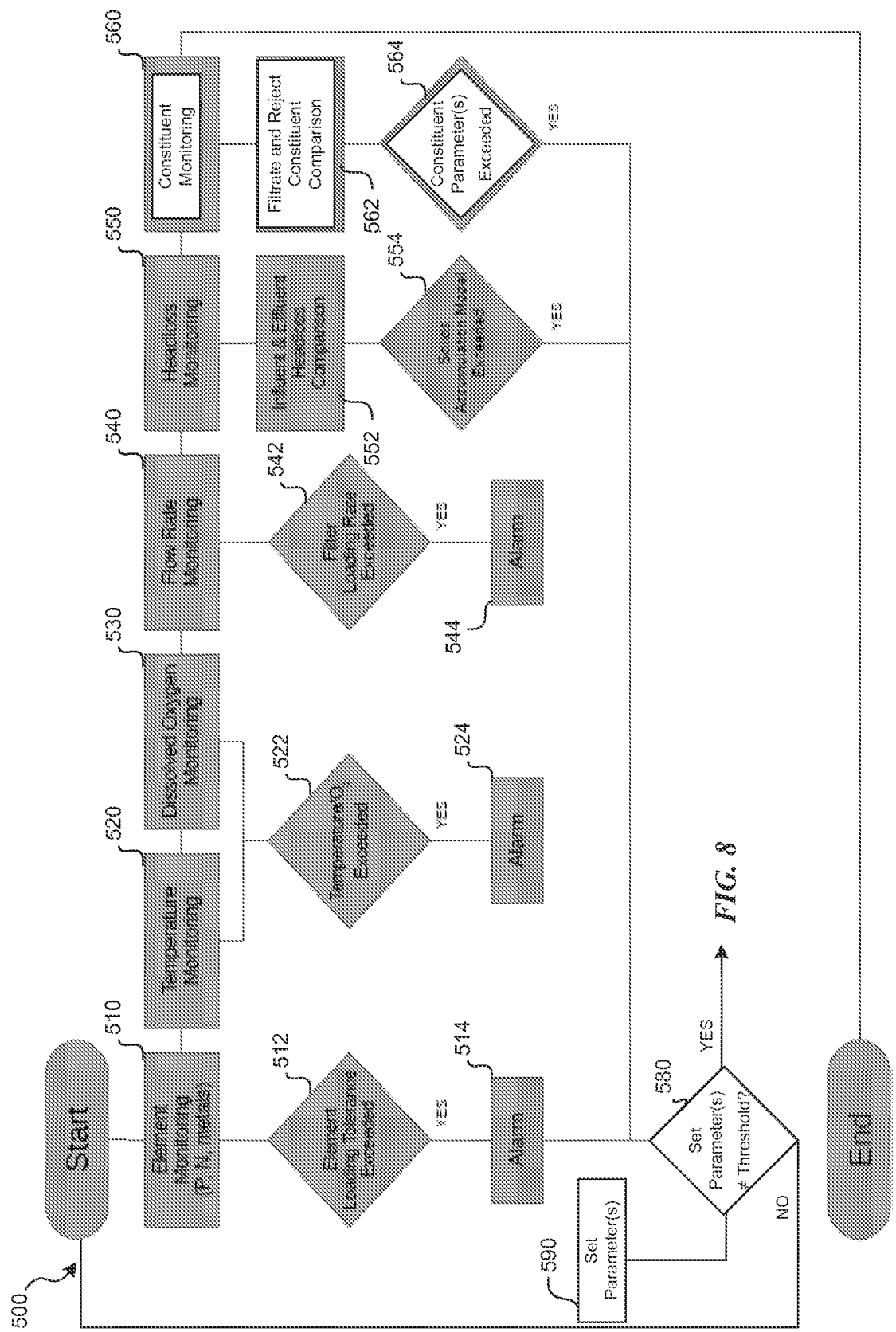
FIG. 5 is a flow chart illustrating an algorithm for determining a filter parameter configured in accordance with embodiments of the present technology.

FIG. 5 is a flow chart illustrating a subroutine or algorithm 500 for (1) determining one or more filter parameters based on one or more measured operating parameters, and (2) evaluating the filter parameter(s) by comparing the filter parameters to a threshold. As used herein, "threshold" can refer to a single value (e.g., the controller may compare whether the calculated filter parameter(s) are less than, equal to, or greater than a threshold) and/or a range of values (e.g., the controller may compare whether the calculated filter parameter(s) are within or outside of a threshold). Additionally, a threshold can be determined based on dynamic measurements and/or historical and/or known operating values. As shown at inputs 510, 520, 530, 540, 550 and 560, the control system 400 is configured to receive measurements of various monitored operating parameters (e.g., element concentrations, fluid temperature, pressure, media size, flow rate, turbidity, suspended particulate concentration, etc.) and, via one or more algorithms, use those measurements to calculate a desired filter parameter. Various examples of filter parameter calculations and related operating parameters are discussed below with reference to FIG. 5. It will be appreciated, however, that more or fewer measured operating parameters and/or filter parameters can be determined based on the specific needs of the fluid treatment application.

As shown at blocks 510, 512 and 514, the control system 400 can be configured to calculate and evaluate element loading within the fluid treatment system 130. Element loading can be an advantageous filter parameter to monitor in several fluid treatment applications, such as fluid treatment processes involving nonmetals (phosphorus, nitrogen, selenium, arsenic, etc.) and metals (mercury, zinc, etc.). To determine the element loading parameter, the control system 400 can execute one or more algorithms. For example, the control system 400 can execute an algorithm that takes the difference between the measured influent and effluent concentrations and/or flowrates. Other suitable algorithms and/or operating parameters can be used. As indicated at decision 512, the control system 400 (or subroutine 500) can evaluate or compare the element loading parameter to a stored threshold and determine whether the reject valve 119 should be closed/opened and/or the airlift tube 109 activated/deactivated. For example, if the element loading parameter is too high, then the control system 400 will open the reject valve 119 and/or activate the airlift tube 109 so as to increase the rate of filtration.

Figure 6:
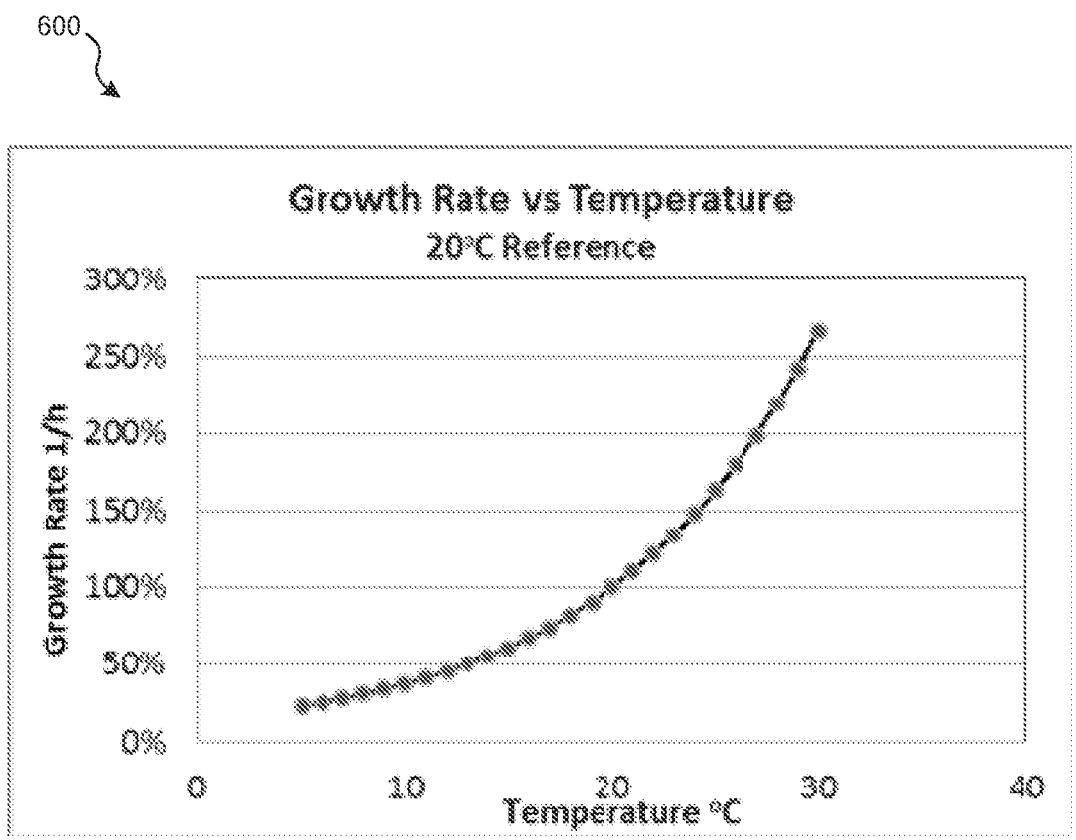
FIG. 6 is a graph depicting an example of a time and temperature-based solids accumulation curve utilized by filtration control systems configured in accordance with embodiments of the present technology.

As shown at blocks 520, 530 and 522 the control system 400 can be configured to measure fluid temperature and/or dissolved oxygen as independent variable parameters in a control function to compare a dependent variable parameter such as biological growth rate to design thresholds within the fluid treatment system 130. The filter parameters of temperature and/or dissolved oxygen can be advantageous to monitor in several fluid treatment applications, such as controlling a biological process within the filter system or when using standard temperature correction for fluid property calculations (e.g., density). FIG. 6 is a graph depicting an example of a time and temperature-based biological solids accumulation curve utilized by control systems configured in accordance with embodiments of the present technology. In some embodiments, the subroutine 500 measures or calculates solids levels such as elemental inorganic solids or organic solids including biological solids.

Using temperature and/or dissolved oxygen, the control system 400 can execute further control decisions. For example, the control system 400 can execute an algorithm that comparing a measured temperature and dissolved oxygen levels thresholds minimums required for the fluid treatment system to achieve a required treatment efficiency. If the minimum measurements are not sensed, then automated corrective action can be taken ultimately resulting in alarm status if manual [non-automated] actions are needed. Other suitable algorithms and/or operating parameters can be used. As indicated at decision 522, the control system 400 (or subroutine 500) can evaluate or compare the temperature and dissolved oxygen parameters to a stored threshold and determine whether the reject valve 103 should be closed/opened and/or the airlift tube 109 activated/deactivated.

As shown at blocks 540-544, the control system 400 can be configured to measure, calculate and evaluate filter loading rate within the fluid treatment system 130. Filter loading rate can be an advantageous filter parameter to monitor in many fluid treatment applications since the loading rate has direct correlation to filter system fluid pressures and filtrate quality. To determine the filter loading rate, the control system 400 can execute one or more algorithms. For example, the control system 400 can execute an algorithm that takes measured input fluid flowrate and turbidity parameters with a static filter system property, such as media volume or surface area, to determine elemental or solids accumulation levels within the system. Other suitable algorithms and/or operating parameters can be used. As indicated at decision 542, the control system 400 (or subroutine 500) can evaluate or compare the filter loading rate parameter to a stored threshold and determine whether the reject valve 103 should be closed/opened and/or the airlift tube 109 activated/deactivated. For example, if the filter loading rate is too high, then the control system 400 will close the reject valve 103 and/or deactivate the airlift tube 109 so as to save energy.

As shown at blocks 550, 552, and 554, the control system 400 can be configured to calculate and evaluate headloss within the fluid treatment system 130. The control system 300 can be configured to calculate influent headloss and effluent headloss, as well as compare influent and effluent headloss to develop a solids accumulation model. To determine influent headloss, for example, the control system 400 can execute one or more algorithms utilizing one or more operating parameters, such as hydraulic loading, fluid temperature, feed constituent concentration, media size, and others. Other suitable algorithms and/or operating parameters can be used. As indicated at decision 552, the control system 400 (or subroutine 500) can evaluate or compare the influent headloss parameter to a stored threshold and determine whether the reject valve 119 should be closed/opened and/or the airlift tube 109 activated/deactivated. For example, if influent headloss is too high, then the control system 400 will open the reject valve 119 and/or activate the airlift tube 109.

To determine effluent headloss status, the control system 400 can execute one or more algorithms utilizing one or more operating parameters, such as influent forward flowrate, effluent weir configuration, and others. Other suitable algorithms and/or operating parameters can be used. As indicated at decision 552, the control system 400 (or subroutine 500) can evaluate or compare the effluent headloss parameter to a stored threshold and determine whether the reject valve 103 should be closed/opened and/or the airlift tube 109 activated/deactivated. For example, in a multi module shared head distribution filter system if effluent headloss in a module exceeds a threshold, then the control system 400 will activate an algorithm to open reject valves and activate airlift tubes in modules with lower effluent headloss in order to balance effluent headloss and flow rates across all modules.

Figure 7:
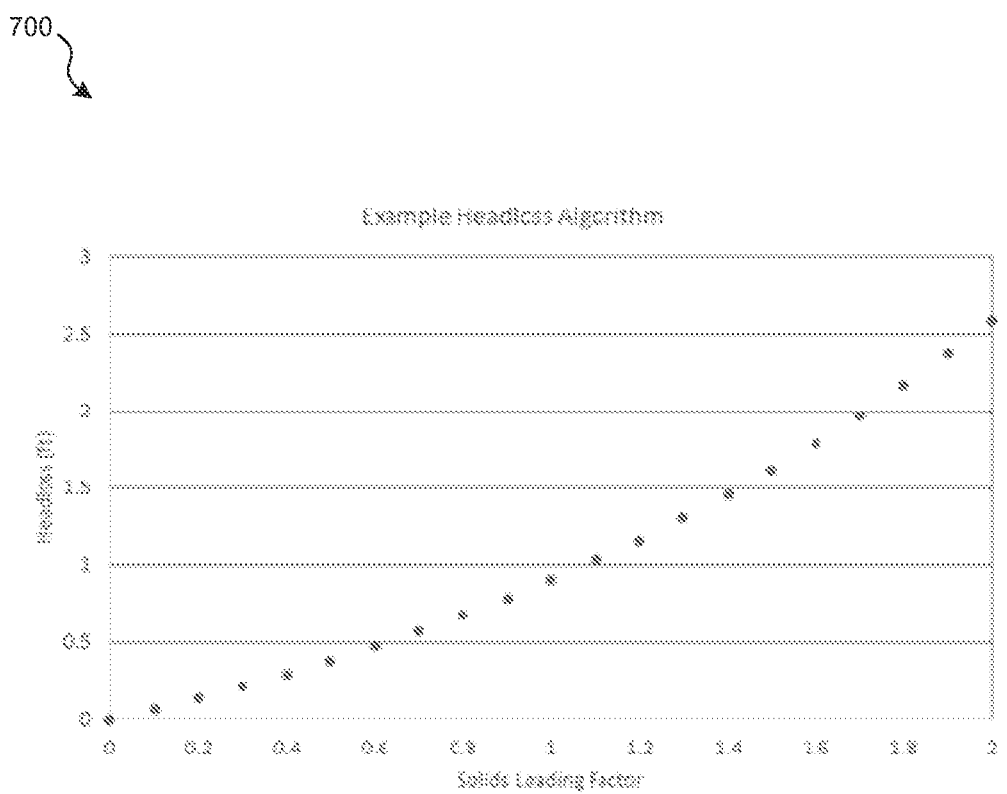
FIG. 7 is a graph depicting an example of a mass loading versus headloss curve utilized by filtration control systems configured in accordance with embodiments of the present technology.

FIG. 7, for example, is a graph 700 depicting an example of a mass loading versus headloss curve utilized by the control system 400.

As shown at blocks 560-564, the control system 400 can be configured to calculate and evaluate constituent concentration and/or clarity within the fluid treatment system 130, such as constituent concentration and/or clarity of the reject stream 108. Such a filter parameter can inform operation of the fluid treatment system 130, for example, as it can be advantageous for the reject constituent concentration to be substantially higher in magnitude than that of the filtrate.

In any of the algorithms and/or subroutine examples disclosed herein, in addition to or in substitute of opening/closing the reject valve 119 and/or activating/deactivating the airlift, the control system 400 can also initiate/cease media washing and/or adjust media washing rates and activate/deactivate or increase/decrease the pneumatic requirement. Also, in some embodiments a predetermined period of inactivity and/or logged operational data can also trigger one or more algorithms disclosed herein and/or cause the control system 400 to modify operation of the fluid treatment system 130. Furthermore, any of the subroutines and/or algorithms disclosed herein can result in an alarm status with air-bursting routines to automatically self-correct the fluid treatment system.

Referring still to FIG. 5, the subroutine 500 is configured such that an operator (human or program) can, based on a particular fluid treatment application, select all, some, or none (at 590) of the six filter parameters (referred to herein as "set filter parameters" or "set parameters") to be calculated and/or be determinative at decision 580. Upon evaluation and/or comparison of one or more of the set filter parameters with a threshold, the control system 400 can then compare the filter parameter to a threshold specific to the set filter parameter(s). Should the comparison indicate that a change in the fluid treatment system operation is needed (e.g., open/close reject valve, activate/deactivate airlift tube, etc.), the subroutine 500 can trigger subroutine 800, as shown in FIGS. 5 and 8.

Figure 8:
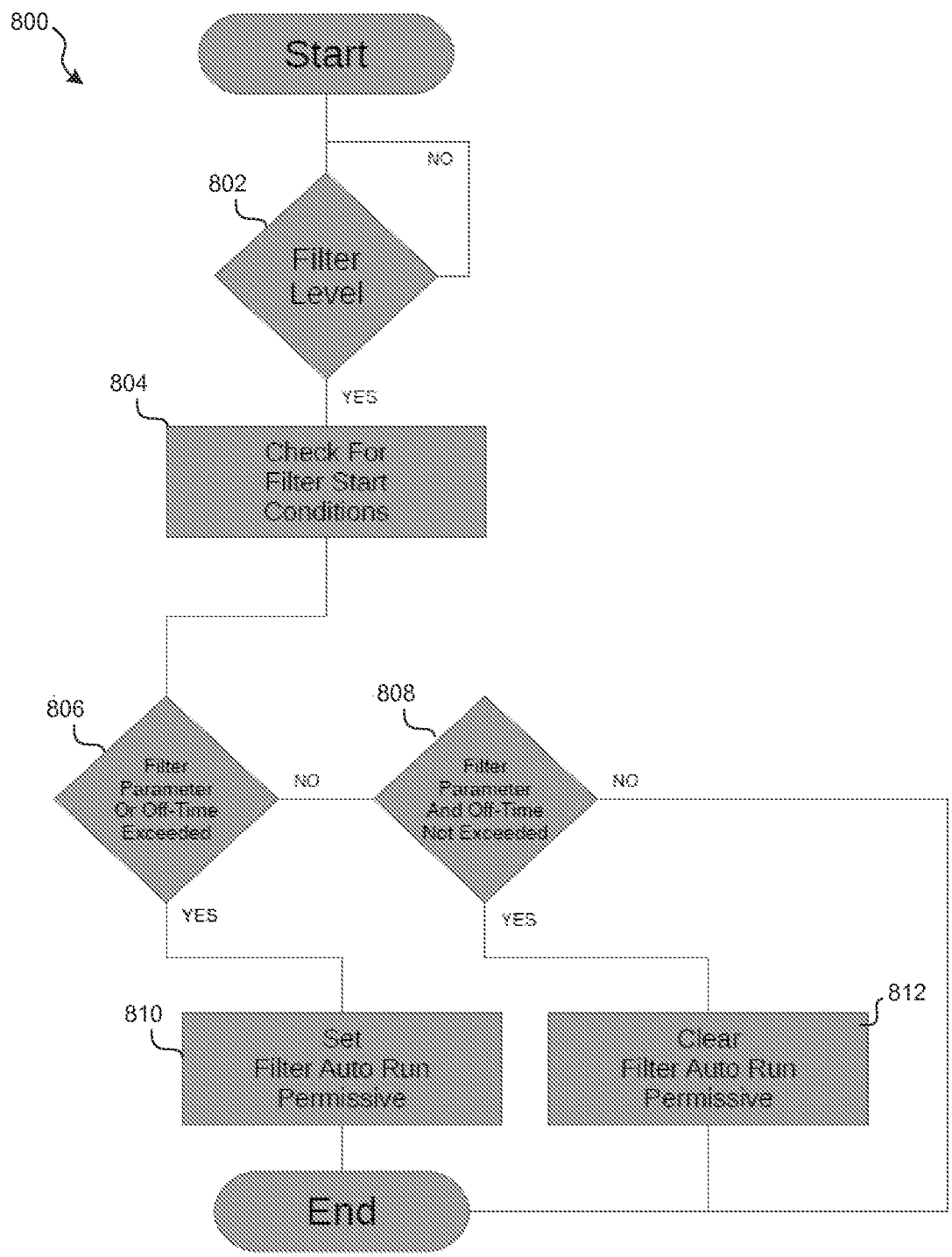
FIG. 8 is a flow chart illustrating an algorithm for automatically starting and stopping various filtration operations within a fluid treatment system configured in accordance with embodiments of the present technology.

FIG. 8 is a flow chart illustrating a subroutine 800 for automatically starting and stopping various filtration operations within a fluid treatment system configured in accordance with embodiments of the present technology. Before activating or deactivating the fluid treatment system at 810 or 812, respectively, in response to the filter parameter(s) value(s) calculated in subroutine 500 (decision indicated at 806, 808), the control system 400 checks fluid level for consistency with expected thresholds based on status of parallel subroutines. (The control system 400 is constantly monitoring fluid level.) Should the control system 400 find, for example, fluid levels to be higher than desired, an alarm status can be generated and an air-bursting sequence initiates the fluid treatment system 130 to operation within acceptable parameters. In those embodiments having two or more fluid treatment systems in parallel, the control system 400 can calculate the flowrate out of each individual washbox assembly based on the washbox fluid level. This information in tandem with other subroutine status can trigger one or more subroutines to effect system efficiencies.

Figure 9:
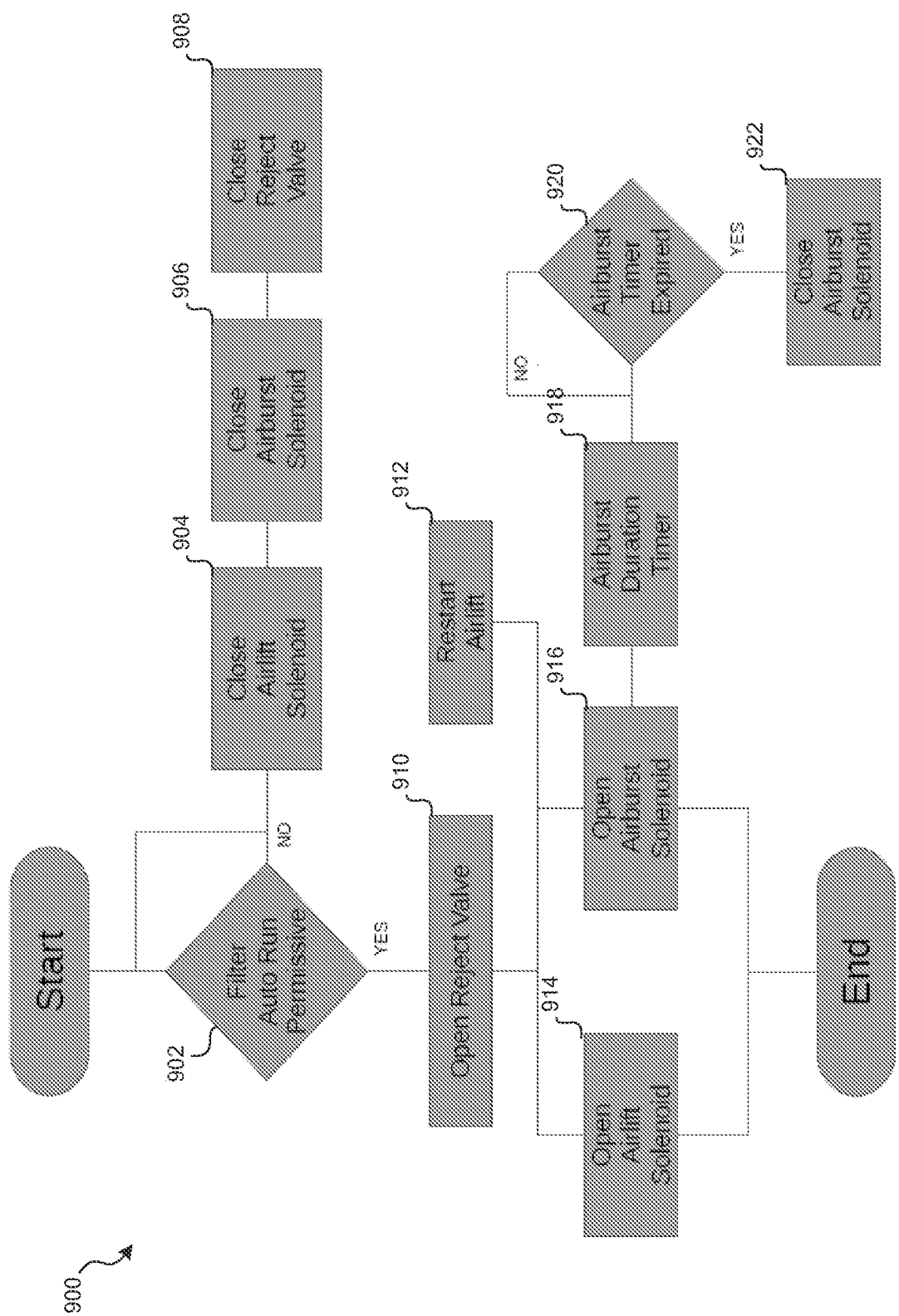
FIG. 9 is a flow chart illustrating an algorithm for timing airlift and reject valve operation configured in accordance with embodiments of the present technology.

FIG. 9 is a flow chart illustrating a subroutine 900 for timing airlift and reject valve operation configured in accordance with embodiments of the present technology. At the start of continuous mode, the reject valve opens and a timed airburst sequence starts the media pumping. The timing of both events are operator adjustable. The fluid treatment system 130 remains in continuous operation until all parallel subroutines for headloss, constituent mass loading, logged time, and acceptable media recycle status achieved. At this time, the filter will switch either into intermittent airlift mode by stopping the airlift and closing the reject valve; or to optimal media recirculation mode by modulating the air supply to the airlift. The control unit also utilizes a timed mode to deter prolonged headloss accumulation. Some benefits of running with an interrupted or modulating airlift sequence include: reduced operation and maintenance costs, improved filtrate quality, reduced reject rate, improved energy efficiency, Improved biomass retention when operated as bioreactor.

Figure 10:
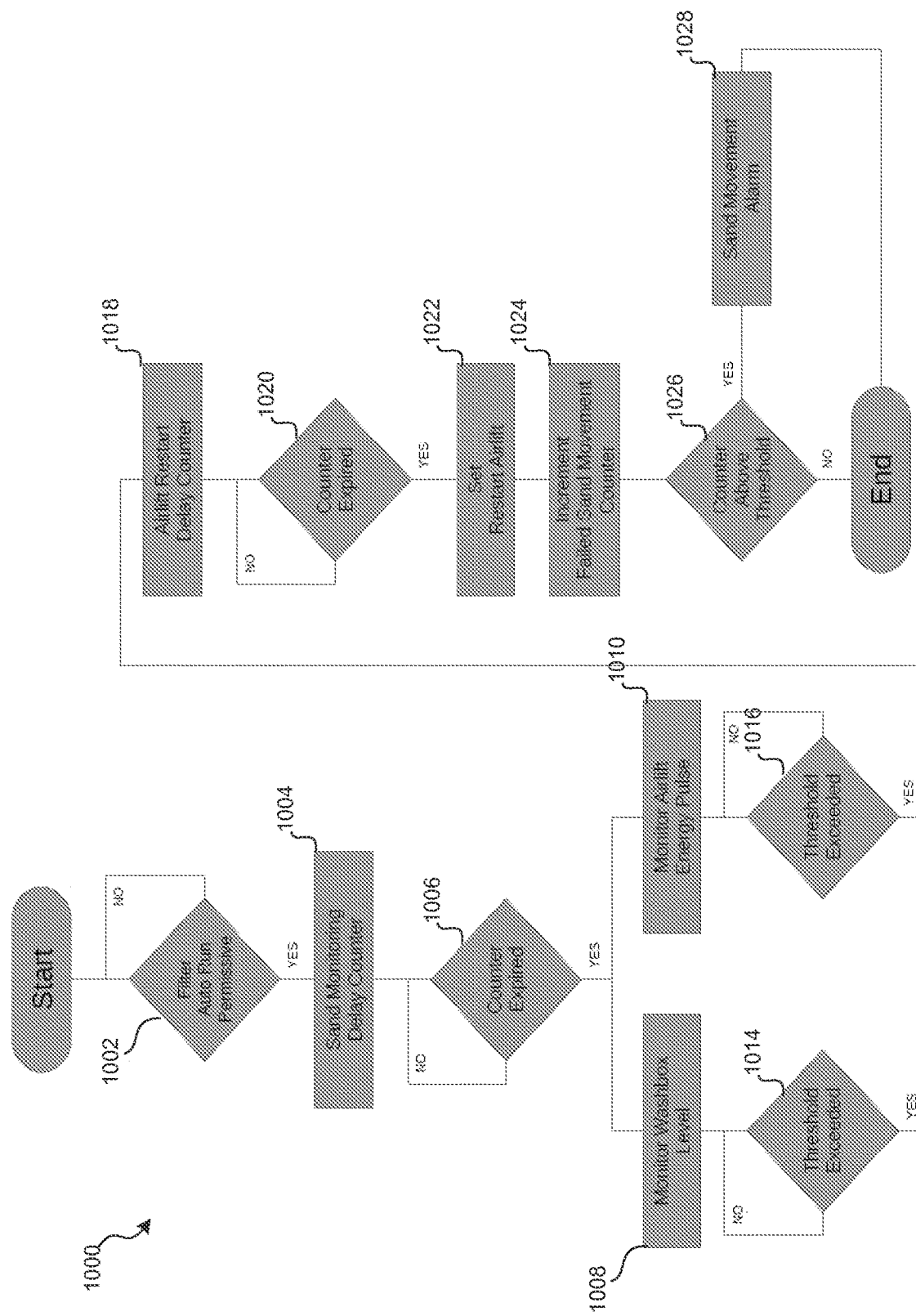
FIG. 10 is a flow chart illustrating an algorithm for monitoring media within a fluid treatment system configured in accordance with embodiments of the present technology.
Figure 11:
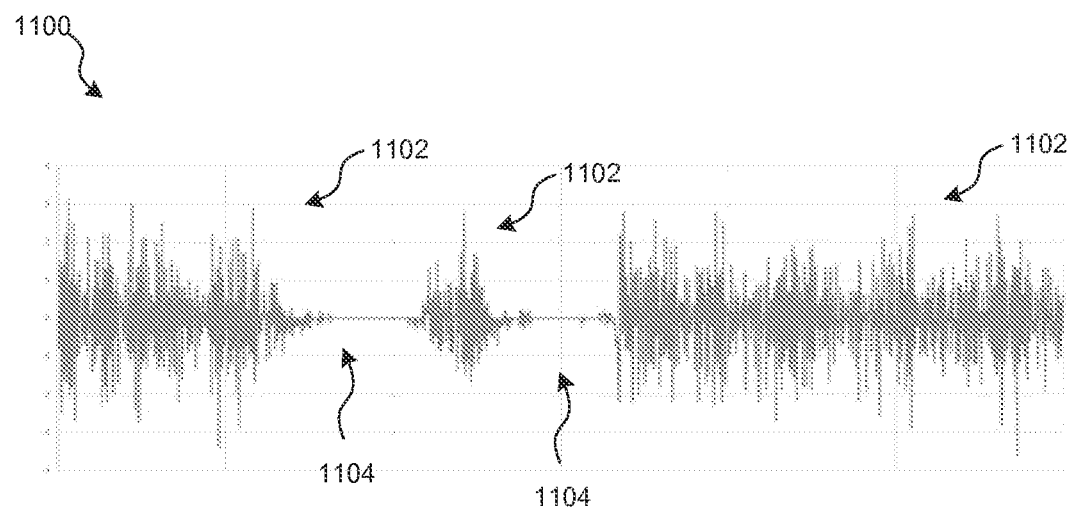
FIG. 11 is a graph depicting an example output from a media monitoring sensor configured in accordance with embodiments of the present technology.
Figure 12:
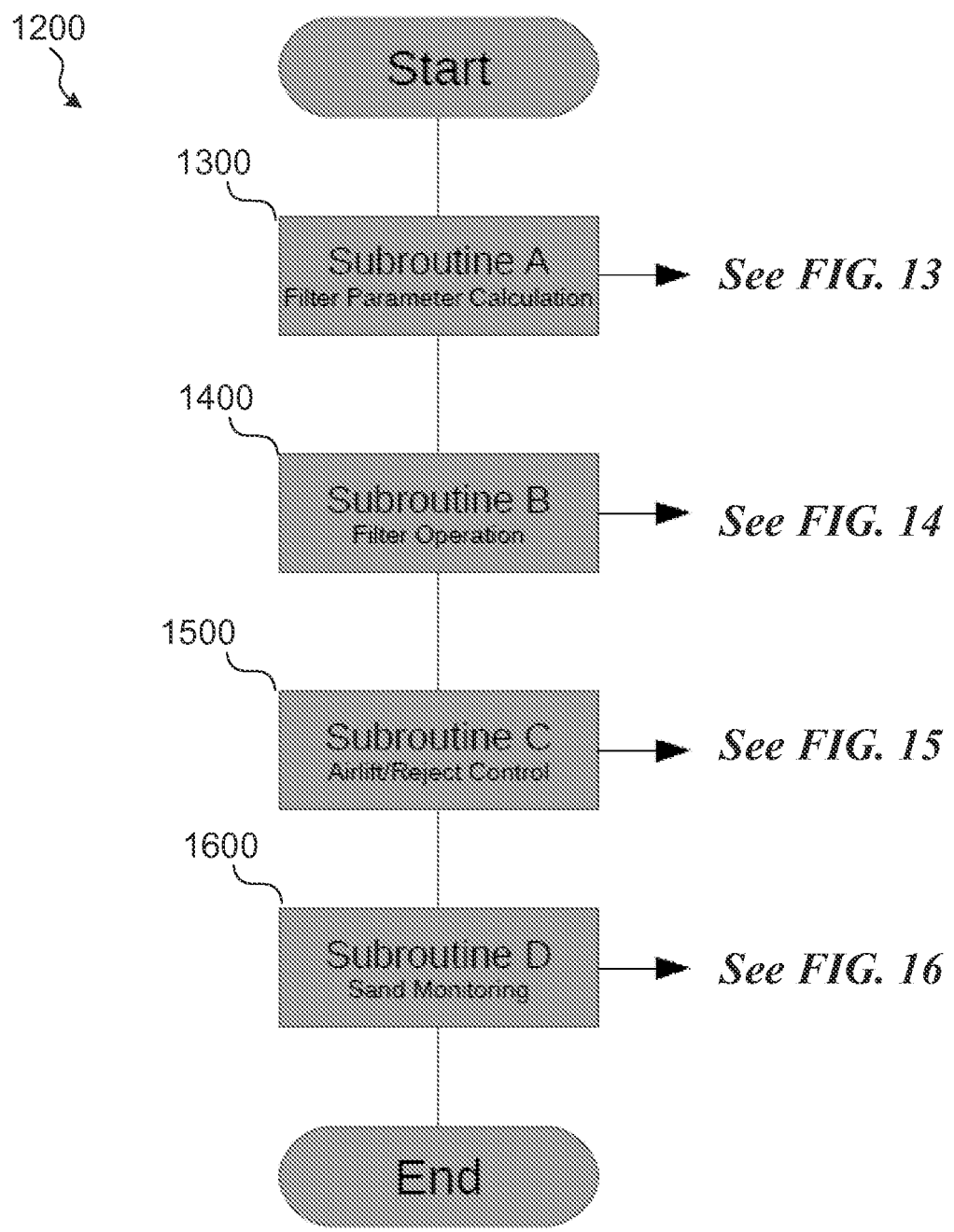
FIG. 12 illustrates an algorithm for automatically monitoring and controlling filtration operation within a fluid treatment system configured in accordance with embodiments of the present technology.
Figure 13:
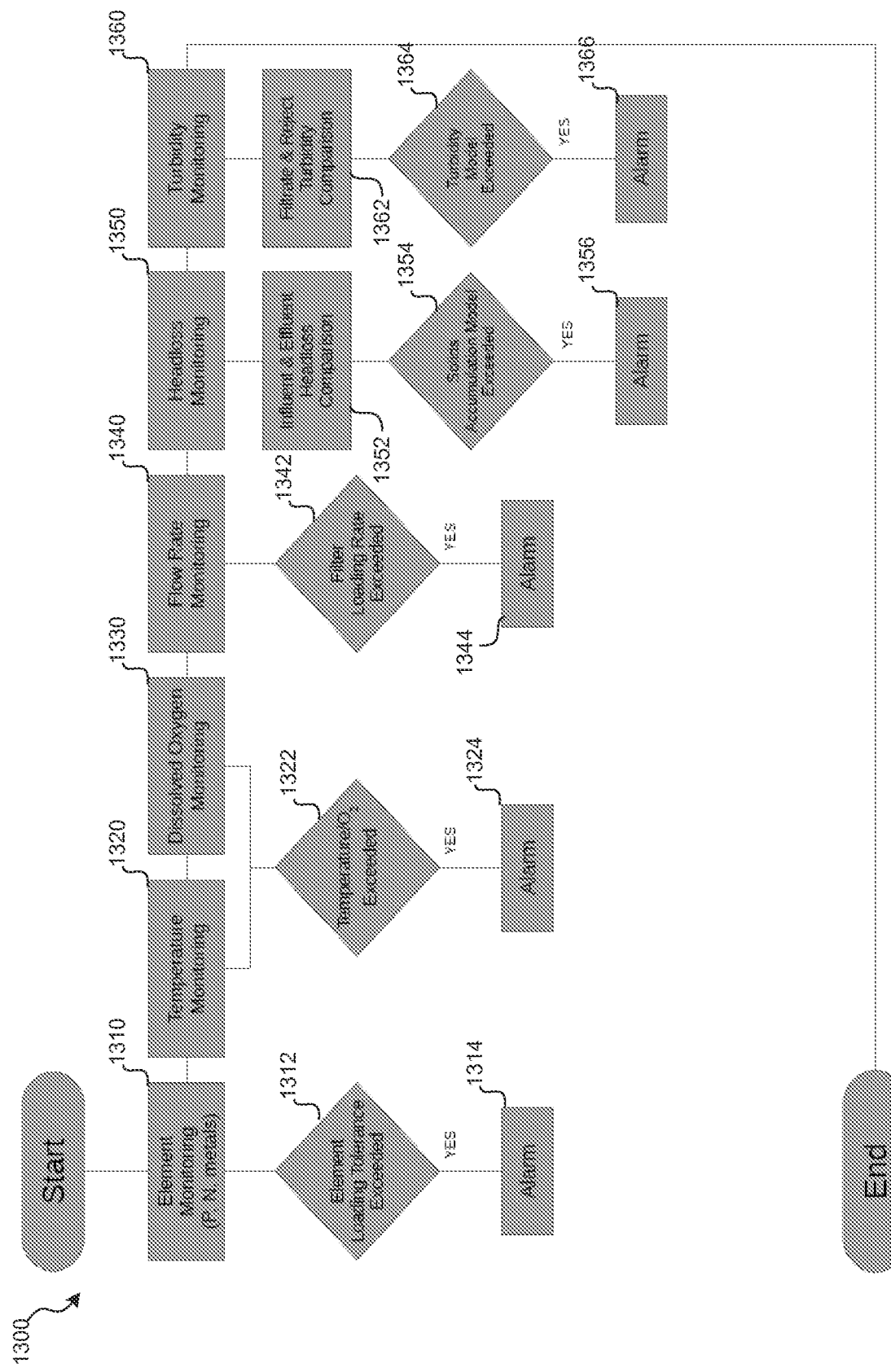
FIG. 13 illustrates an algorithm for configured in accordance with embodiments of the present technology.
Figure 14:
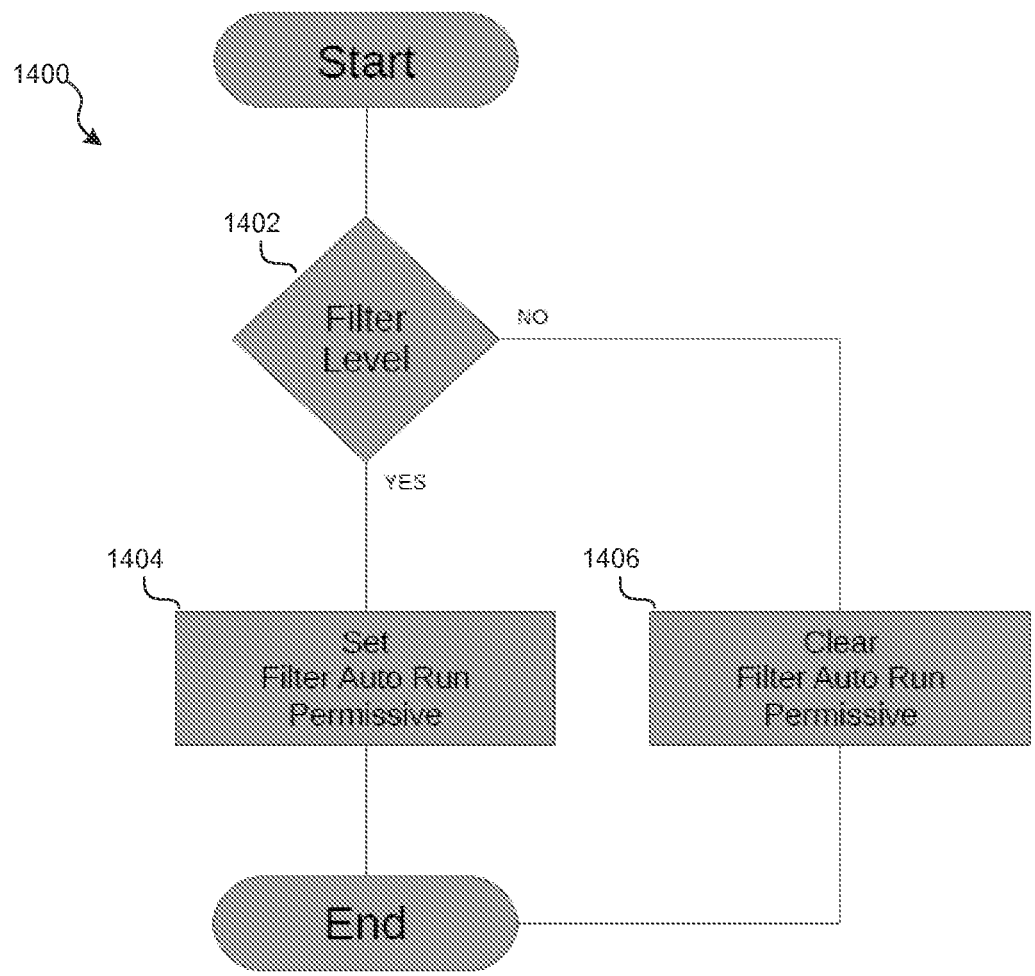
FIG. 14 illustrates an algorithm for automatically starting and stopping various filtration operations within a fluid treatment system configured in accordance with embodiments of the present technology.
Figure 15:
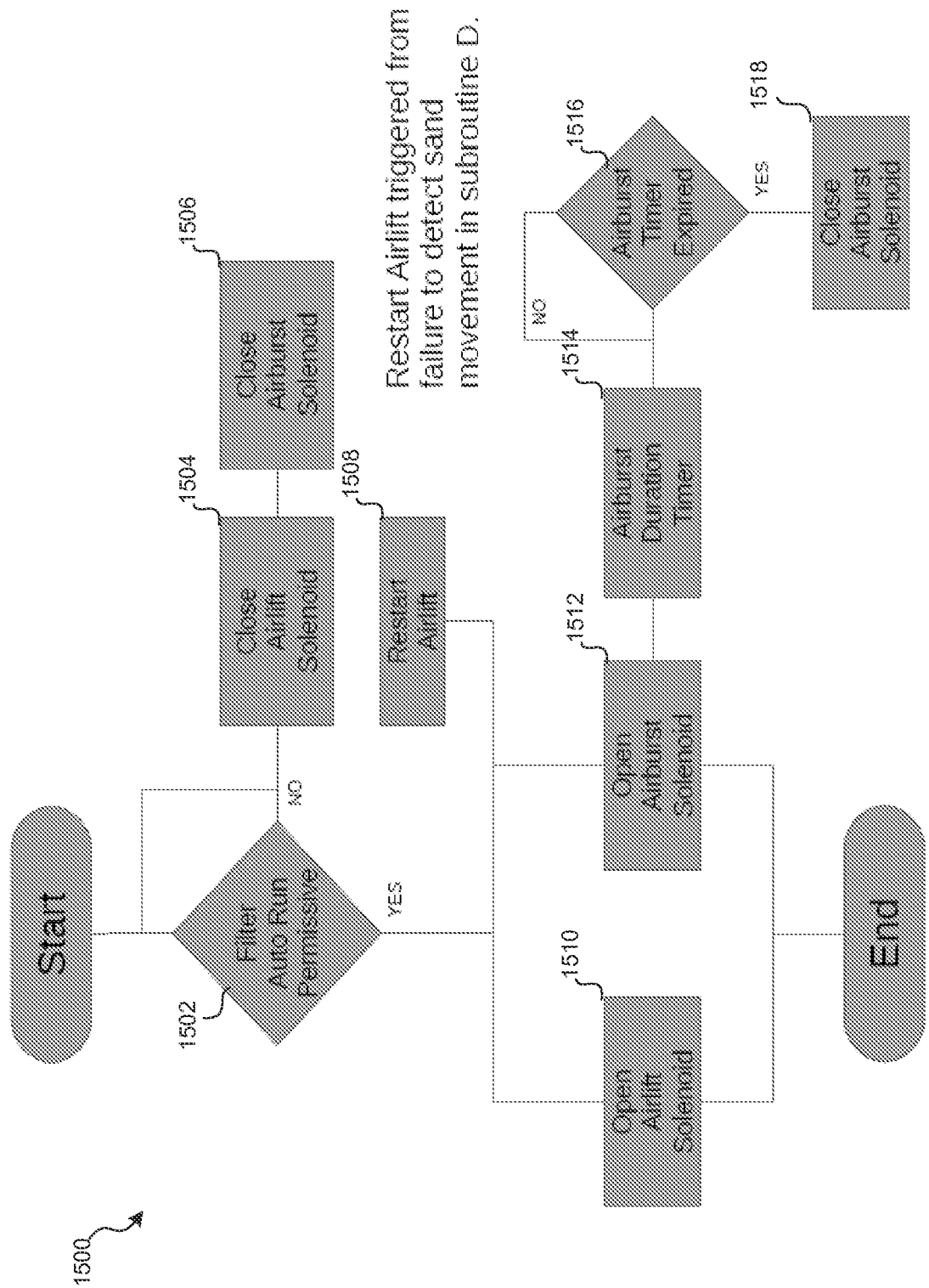
FIG. 15 illustrates an algorithm for timing airlift operation configured in accordance with embodiments of the present technology.
Figure 16:
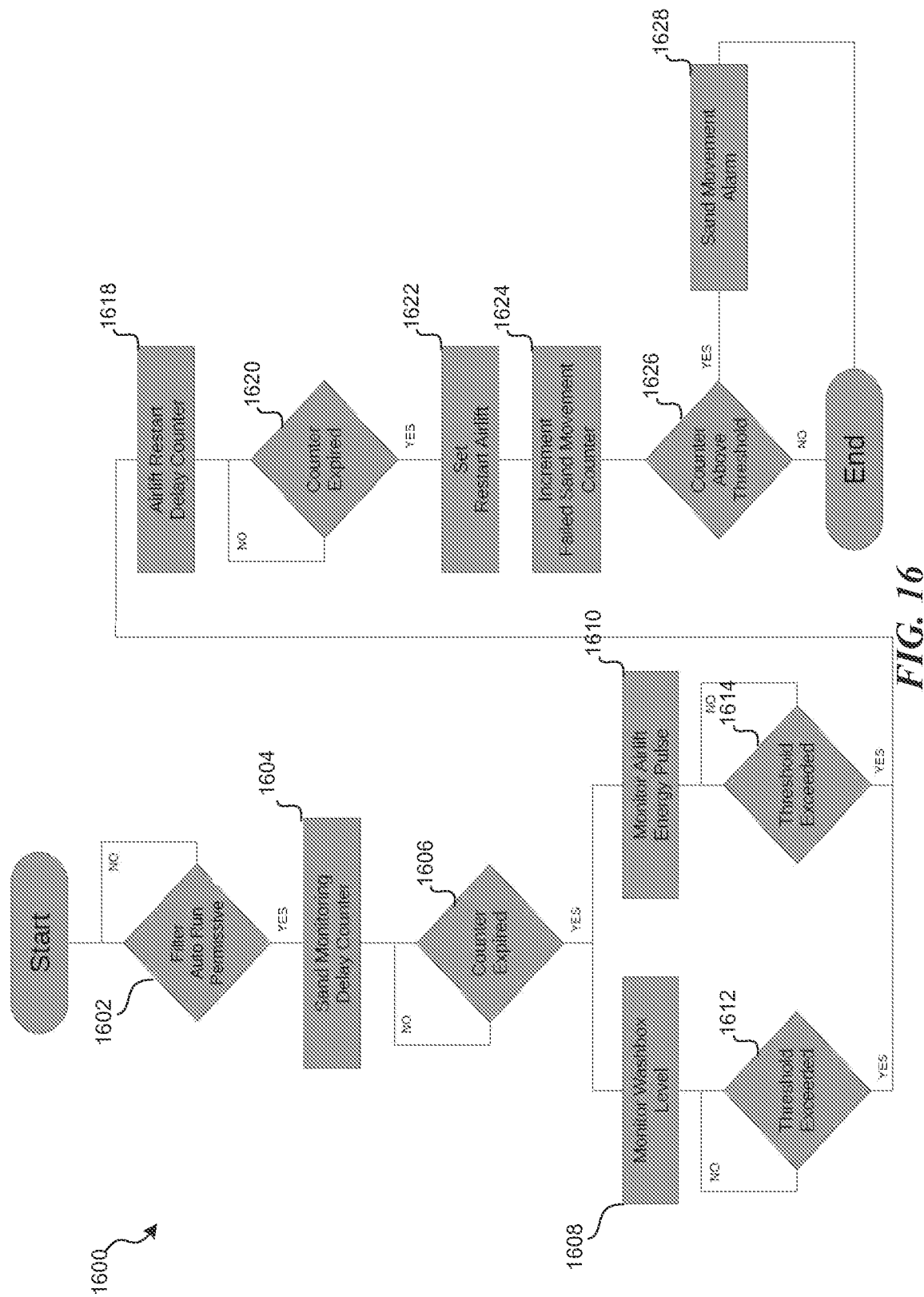
FIG. 16 illustrates an algorithm for monitoring media within a fluid treatment system configured in accordance with embodiments of the present technology.

FIG. 10 is a flow chart illustrating an algorithm for monitoring media within a fluid treatment system configured in accordance with embodiments of the present technology. The control system 400 can continuously monitor the media recycle within the filter system using a sensing device capable of energy pulsation measurement. FIG. 11 is a graph depicting an example output from a media monitoring sensor configured in accordance with embodiments of the present technology. For example, sensor 120 (FIG. 3) can be configured to measure vibrations in the washbox 107. The control system 400 then compares the measured energy pulsations to the expected status compatible with parallel subroutines to ensure consistency. The control system 400 can trigger status of required media washing with a pneumatic system and an automated reject valve. The algorithm can also dictate to initiate/cease media washing, activate/ deactivate or increase/decrease the pneumatic requirement, and open/close the filter reject valve.

In some embodiments, the control system utilizes a timed mode to deter prolonged headloss accumulation. Since the air requirement to the filter(s) varies during normal operation, a compressor or VFD will minimize the waste of air generated, thus reducing the energy footprint of the system. The control system can also utilize a timed mode to deter prolonged headloss accumulation. The control system can continuously monitors sand movement with an ultrasonic sensor fitted to the top of the washbox. The control system can generate an alarm if any airlift stops pumping. This reduces operator attention and can be monitored remotely. The described monitor, valve(s), and controller can be integrated without a VFD driven compressed air system, but more benefit will be seen with the described compressed air system. A secondary component that directly integrates and complements the above monitor, valve, and controller is use of VFD compressor systems. Since the air requirement to the filter(s) varies during normal operation, a compressor system or VFD will minimize waste air generated, thus reducing the energy footprint of the system.

FIGS. 12-16 disclose a control system 1200 and subroutines 1300-1600 that are generally similar to the control system 400 and subroutines 500 and 800-1200, except the control system 1200 and subroutines 1300-1600 do not include algorithms for controlling and/or triggering reject valve opening/closing. As such, the control system 1200 and subroutines 1300-1600 can be used with fluid treatment systems that do not include reject valves. Also, control system 1200 can be run independently of or as a complement to control system 400.

The control system of the present technology provides several advantages over conventional media systems. To begin, the control system disclosed herein reduce operation and maintenance costs, as only the minimum required compressed air will be needed for operating. Likewise, the compressor will have a lower duty requirement. In multi-filter systems the compressor can be run at a minimum level of output as multiple filter cells cycle through usage requirements. Also, the control system improves filtrate quality, as operating media systems without backwash can lead to finer filtration of particulate. This of course needs to be balanced with operating head loss. Another advantage of the present technology is a reduction in reject rate—interruption of the reject stream will produce less backwash, which has a re-treatment cost associated with it. Yet another example is improved energy efficiency—this is the ultimate goal. Less energy will be needed for generation of compressed air and treatment of backwash.

The order in which the above systems and methods are described is not intended to be construed as a limitation, and any number of the described features and steps can be combined in any order and can be utilized in parallel. Furthermore, the technology described herein can be implemented in any suitable hardware, software, firmware, or combination thereof such that a computing device can implement the technology. In one case, a method is stored on a computer-readable storage media, such as RAM, hard drive, optical disc, etc., as a set of instructions such that execution by a computing device, causes the computing device to perform the method.

From the foregoing it will be appreciated that, although specific embodiments of the technology have been described herein for purposes of illustration, various modifications may be made without deviating from the spirit and scope of the technology. Further, certain aspects of the technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A fluid treatment system, comprising:
a vessel configured to receive a fluid having one or more constituents via an inlet and configured to separate one or more constituents from the fluid;
a sensor positioned on or within the vessel, wherein the sensor is configured to obtain a measurement of an operating parameter;
an outlet coupled to the vessel and configured to receive a reject stream from the vessel, wherein the outlet includes a reject valve coupled to a controller, the reject valve being capable of opening and closing while fluid continues to be received via the inlet, and wherein a memory stores instructions that, when executed by the controller using a processing circuitry, causes the controller to—
determine a filter parameter based on the measurement;
compare the filter parameter to a threshold; and
based on the comparison, open or close the reject valve, wherein the vessel further includes a washbox, and wherein the filter parameter is calculated based on at least one of influent into the vessel, effluent out of the vessel, or a headloss of the washbox.

2. The system of claim 1 wherein, to determine the filter parameter, the controller calculates the filter parameter based on the measurement.

3. The system of claim 1 wherein the sensor is a first sensor and the measurement is a first measurement, and wherein the system further includes a second sensor configured to take a second measurement, and wherein the threshold is based on the first measurement and the second measurement.

4. The system of claim 1 wherein the threshold is a single value.

5. The system of claim 1 wherein the threshold is a static or dynamic range of values.

6. The system of claim 1 wherein the operating parameter is at least one of concentration, temperature, pressure, a fluid flow rate to the system, or a rate of energy pulsations in the washbox positioned within the vessel.

7. The system of claim 1 wherein the filter parameter is one of headloss or constituent mass loading.

8. A fluid treatment system, comprising:
a vessel configured to receive a fluid having one or more constituents via an inlet and configured to separate one or more constituents from the fluid;
a sensor positioned on or within the vessel, wherein the sensor is configured to obtain a measurement of an operating parameter;
an outlet coupled to the vessel and configured to receive a reject stream from the vessel, wherein the outlet includes a reject valve coupled to a controller, the reject valve being capable of opening and closing while fluid continues to be received via the inlet, and wherein a memory stores instructions that, when executed by the controller using a processing circuitry, causes the controller to—
determine a filter parameter based on the measurement;
compare the filter parameter to a threshold; and
based on the comparison, open or close the reject valve, wherein the vessel includes a tube extending along at least a portion of the vessel, wherein the tube is fluidly coupled to a pressurized air source.

9. The system of claim 1 wherein the sensor is coupled to the washbox and configured to measure at least one of a fluid level within the washbox or energy pulsations within the washbox.

10. A fluid treatment system, comprising:
a vessel configured to receive a fluid having one or more constituents via an inlet and configured to separate one or more constituents from the fluid;
a sensor positioned on or within the vessel, wherein the sensor is configured to obtain a measurement of an operating parameter;
an outlet coupled to the vessel and configured to receive a reject stream from the vessel, wherein the outlet includes a reject valve coupled to a controller, the reject valve being capable of opening and closing while fluid continues to be received via the inlet, and wherein a memory stores instructions that, when executed by the controller using a processing circuitry, causes the controller to—
determine a filter parameter based on the measurement;
compare the filter parameter to a threshold; and
based on the comparison, open or close the reject valve, wherein the controller is configured to compare a filtrate constituent concentration and a reject constituent concentration and open or close the reject valve based on that comparison.

11. A method for controlling one or more filtration operations of a fluid treatment system, the method comprising:
delivering a fluid to a fluid treatment system, wherein the fluid includes one or more constituents,
wherein the fluid treatment system includes a vessel configured to receive the fluid,
wherein the vessel comprises a reject outlet configured to receive a reject stream and a tube extending through at least a portion of the vessel and coupled to a pressurized air source;
obtaining a measurement related to the ongoing filtration operations; determining a filter parameter based on the measurement;
evaluating the filter parameter by comparing the filter parameter to a threshold; and
based on the comparison activating or deactivating the pressurized air source and opening or closing a valve coupled to the reject outlet while continuing to deliver the fluid to the fluid treatment system.

12. The method of claim 11 wherein determining the filter parameter includes the calculating the filter parameter based on the measurement.

13. The method of claim 11 wherein obtaining a measurement is obtaining a first measurement, and wherein the method further includes obtaining a second measurement related to the ongoing filtration operations.

14. The method of claim 13 wherein determining the filter parameter includes determining the filter parameter based on the first measurement and the second measurement.

15. The method of claim 11 wherein determining the filter parameter includes comparing an influent headloss and an effluent headloss.

16. The method of claim 11 wherein the filter parameter is a first filter parameter, and wherein the method further comprises determining a second filter parameter based on the measurement.

17. The method of claim 11 wherein the filter parameter is a first filter parameter related to the filtration operations, the measurement is a first measurement, and the threshold is a first threshold, and wherein the method further comprises—
   obtaining a second measurement related to the filtration operations;
   determining a second filter parameter based on the second measurement;
   evaluating the second filter parameter by comparing the second filter parameter to a second threshold; and
   based on the comparison of the first filter parameter to the first threshold and the comparison of the second filter parameter to the second threshold, activating or deactivating the pressurized air source.

18. The method of claim 11 wherein the measurement is at least one of a concentration measurement, a temperature measurement, and a flow rate measurement.

19. The method of claim 11 wherein the filter parameter is one of headloss or constituent loading.

* * * * *